United States Patent [19]
Tuy

[11] Patent Number: 5,243,664
[45] Date of Patent: Sep. 7, 1993

[54] POST-PROCESSING TECHNIQUE FOR REDUCING METALLIC CLIP ARTIFACTS IN CT IMAGES

[75] Inventor: Heang K. Tuy, Chesterland, Ohio

[73] Assignee: Picker International, Inc., Highland Heights, Ohio

[21] Appl. No.: 760,402

[22] Filed: Sep. 16, 1991

[51] Int. Cl.⁵ ............................................. G06K 9/00
[52] U.S. Cl. .................................. 382/6; 364/413.16; 364/413.19; 382/54
[58] Field of Search ............................. 382/6, 54, 57; 364/413.13, 413.14, 413.16, 413.18, 413.19

[56] References Cited

U.S. PATENT DOCUMENTS

| | | | |
|---|---|---|---|
| 4,217,641 | 8/1980 | Napastok ............................... | 382/6 |
| 4,590,558 | 5/1986 | Glover et al. ......................... | 382/54 |
| 4,792,900 | 12/1989 | Jones et al. ........................... | 382/6 |
| 4,920,491 | 4/1990 | Eberhard et al. ..................... | 382/6 |
| 5,123,054 | 6/1992 | Hava et al. ........................... | 382/6 |

OTHER PUBLICATIONS

"An Algorithm For the Reduction of Metal Clip Artifacts in CT Reconstructions" Glover and Pelc, Med. Phys. vol. 8 No. 6, Nov.-Dec. 1981, pp. 799-807.

"Image Reconstruction From Limited Data", Medoff, et al., International Workshop on Physics and Engineering in Medical Imaging, Mar. 15-18, 1982.

"Reduction of CT Artifacts Caused by Metallic Implants", Kalender, et al. Radiology 1987; 164: 576-577.

Primary Examiner—Joseph Mancuso
Attorney, Agent, or Firm—Fay, Sharpe, Beall, Fagan, Minnich & McKee

[57] ABSTRACT

Radiation from an x-ray source (14) is collected by radiation detectors (16) to generate an original set of CT line integral data (18). The original CT data is subject to a first order correction and reconstructed (20) to generate a first order corrected image representation (22). A first artifact image representation (26) is generated (24) from the first order corrected image. The artifact image representation and the first order corrected image representation are subtractively combined (28) to generate a second order corrected image representation (30). A bone and high density clip image representation (142) is generated from the second order corrected image. The bone and clip image representation is forward projected (144) to generate a first high contrast line integral data set (146). High contrast model line integral data corresponding to rays which traverse the high density clip are topologically transposed (148) for corresponding rays of the original CT data. The topologically transposed CT data is reconstructed (160) to generate a third order corrected image representation (34). A second artifact image representation (38) is derived (36) from the third order image representation. The second artifact image representation and the third order corrected image representation are subtractively combined (40) to produce a fourth order corrected image representation (42) which is displayed on a video monitor (44) or the like.

27 Claims, 7 Drawing Sheets

POST-PROCESSING TECHNIQUE FOR REDUCING METALLIC CLIP ARTIFACTS IN CT IMAGES

BACKGROUND OF THE INVENTION

The present invention pertains to the art of x-ray diagnostic imaging. It finds particular application in conjunction with generating medical diagnostic images through regions of a patient that contain clip, i.e. a metallic or high density implant, such as a tooth filling, a metallic pin or plate, or other prosthetic devices. It is to be appreciated, however, that the invention will also find application in conjunction with the generation of images through animate and inanimate subjects which contain widely disparate CT numbers or radiant energy absorption cross-sections.

Heretofore, CT images through slices which included clips or portions with very high CT numbers, e.g. greater than 1700 (where −1000 represents air and 0 represents water), have had severe artifacts. More specifically, metal prosthetic devices, dental fillings, and other foreign objects with high CT numbers cause dark and white streaks to emanate from the area of the high density object in the reconstructed image. These streaks white out or black out anatomical structure along the flared paths of the streaks for a distance that may be several times the size of the high density object. The streaks obliterate and obscure the anatomical structure in the regions covered by the streaks.

Various attempts have been made to eliminate the streaks and display the previously obliterated soft tissue. In "An Algorithm for the Reduction of Metal Clip Artifacts in CT Reconstructions" Med. Phys. 8(6), Nov/Dec 1981, pp. 799-807, authors Glover and Pelc describe a "rub out" algorithm which eliminates the streaks and the metal clip and replaces the clip with fictitious soft tissue. For each view, Messrs. Glover and Pelc process rays through the clip based on the nearly average views. In the average view, they match the data value along rays that do not intersect the clip to a polynomial to generate a baseline. Each baseline is subtracted from the average to define a signature. The signature is subtracted from the corresponding original view to create a corrected view. When the corrected views are reconstructed by filtered backprojection, an image is generated with the metal clip gone, completely replaced with soft tissue. The complete loss of the metal clip in this technique has significant drawbacks. For example, the exact position and presence of the metal clip is important information in various surgical and other corrective techniques taken as a result of the CT examination. More importantly, the streaking is reduced but not removed.

In "Image Reconstruction from Limited Data" presented at the International Workshop on Physics and Engineering in Medical Imaging, Mar. 15-18, 1982, Messrs. Medoff, Brody, and Macovski proposed an iterative correction. This article suggests comparing each pixel of an image reconstructed from the original data with a constraint, e.g. intensity. The intensities are adjusted in accordance with a priori information. This adjusted image is forward projected to generate a corrected set of line integral data. This article suggests that line integrals representing rays which do not intersect the metal clip are considered to be good and are not changed. The line integrals corresponding to the rays which do intersect the clip are removed and replaced by the corresponding line integral of the adjusted image. The data is reconstructed into an image which is inspected, and the correction process repeated iteratively.

In "Reduction of CT Artifacts Caused by Metallic Implants" Radiology, 164(2) pp. 576-577, August 1987, authors Kalender, Hebel, and Ebersberger suggested a linear interpolation technique. They noted that in the line integral corresponding to each ray through the clip, the clip was represented as a high, relatively narrow spike. In each line integral corresponding to a ray that intersected the clip, the authors deleted the spike and replaced it with a linear interpolation of the data to either side of the spike. This technique still results in noticeable artifacts.

The applicants herein believe that these artifacts in the prior art techniques are due at least in part to the polychromatic nature of the x-ray beam, commonly denoted as beam hardening. The CT projection or line integral data is commonly corrected for beam hardening such that soft tissue data can be treated as if it were generated by a substantially monochromatic beam. However, metal, and to some extent bone, are sufficiently more dense that the beam hardness correction is inaccurate. Replacing the metal clip portion of the ray with the linear interpolation of the adjoining tissue incorporates these beam hardening errors into the correction resulting in artifacts.

The present invention contemplates a new and improved technique for reducing clip artifacts.

SUMMARY OF THE INVENTION

In accordance With the present invention, a method and apparatus are provided for generating an artifact or error image. The artifact image is subtracted from a reconstructed image which includes clip artifacts.

In accordance with a more limited aspect of the present invention, first or higher order corrections are made either before the artifact image is generated and/or before generating the artifact degraded image.

In accordance with a more limited aspect of the present invention, the clip sinogram is computed and subtracted from the original data. For each ray which intersects the clip, a difference between a linear interpolation of the line integrals of the two rays at the extreme edges of the clips and the differential value along the corresponding ray is determined. If the differential value along the corresponding ray is less than the linear interpolation, the difference is added to the corresponding line integral of the original data to perform a first order correction for beam hardening.

In accordance with another more limited aspect of the present invention, a high contrast model image, i.e. an image of the bone and clip with a uniform water background is generated, preferably from the beam hardness corrected image data. The high contrast model is forward projected to generate high contrast model line integral data. For rays which intersect the clip, the difference is again determined between the linear interpolation of the rays at the extreme edges of the clip and the differential value along the corresponding ray. When the linear interpolation is larger than the differential value, this difference is added to the corresponding ray of the high contrast model. When this data is reconstructed, a corrected high contrast model image is generated. An error image is generated from the difference between the high contrast model and the corrected high contrast model image, which error image is combined with the beam hardness corrected image to generate a second order corrected image.

In accordance with another more limited aspect of the present invention, high contrast model line integral data or sinograms are generated, preferably from the second order corrected image. The original data value corresponding to each ray which intersects the clip is deleted, i.e. the clip sinogram is removed, and is replaced with corresponding data from the high contrast model line integral data. In accordance with the preferred embodiment, only line integrals which correspond to a ray passing through the clip are retained in the high contrast model line integral data, i.e. the high contrast model sinograms. This data or sinograms are shifted in amplitude to match the original data and are substituted for the deleted clip data. This data is reconstructed to generate another corrected image, e.g. a third order corrected image.

In accordance with another more limited aspect of the present invention, another bone and clip image is generated, preferably from the third order corrected image. The high contrast model image is forward projected into line integrals. The portions of the line integrals corresponding to the clips are replaced, by topological transposition, with the corresponding clip data from the preceding high contrast model or clip image. The topological transposition corrected line integrals of the third bone and clip image are reconstructed into a corrected bone and clip image which is subtracted from the third bone and clip image to generate an error or artifact image. The artifact image is combined with the second order image to create a corrected image. Optionally, additional iterations may be provided to provide higher order corrections.

In accordance with another aspect of the present invention, a high contrast model is generated, preferably from the first order corrected image. The high contrast model data is forward projected and its sinogram corresponding to the clip is replaced with corresponding values from the original data. This sinogram substituted high contrast line integral data is backprojected and subtracted from the high contrast image to provide a negative artifact image. The negative artifact image is combined with the original image to produce an essentially artifact-free image.

One advantage of the present invention is that it reduces clip artifacts.

Another advantage of the present invention resides in its stability.

Another advantage of the present invention is that the correction compensates for beam hardness.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
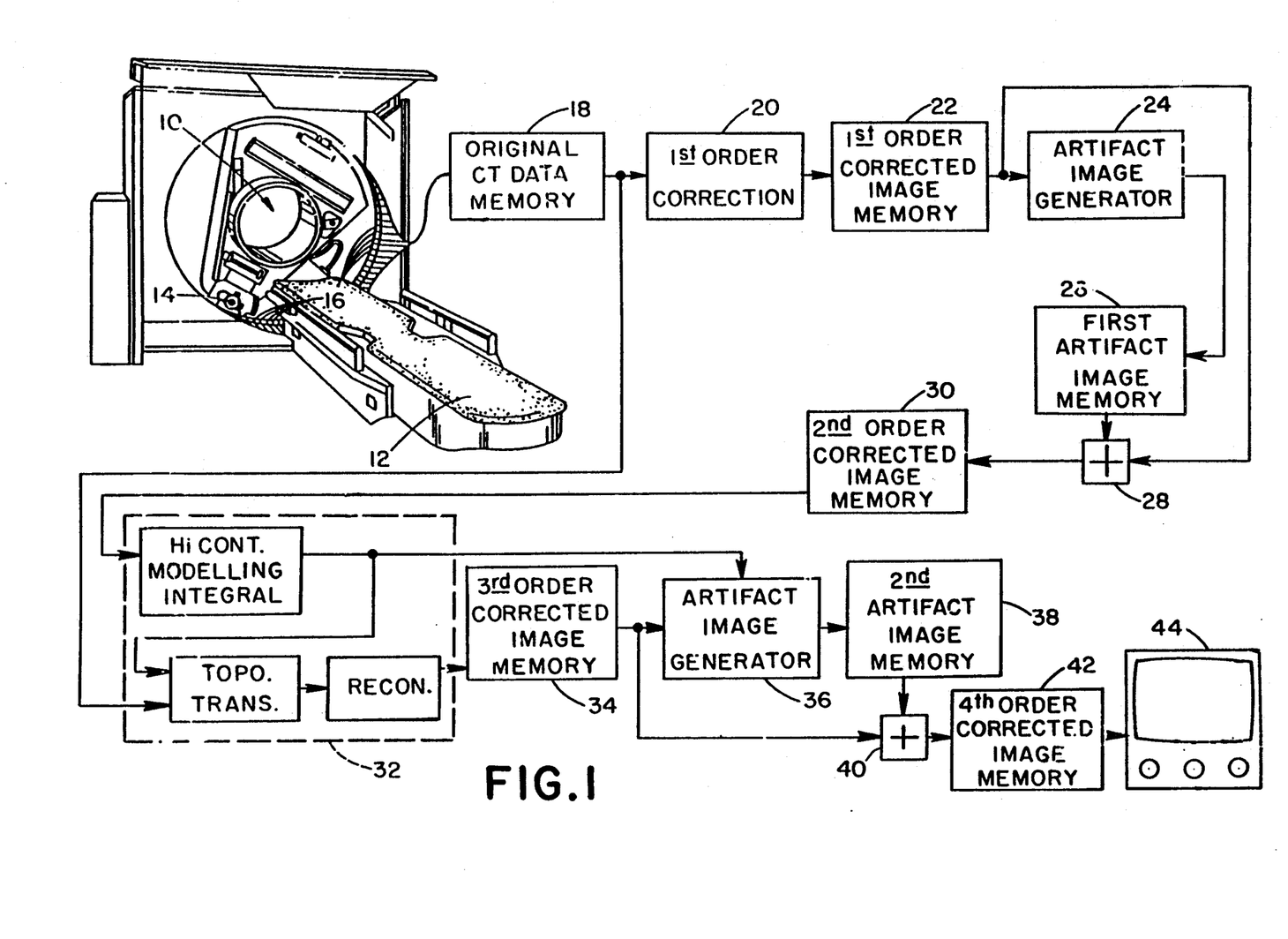
FIG. 1 is a diagrammatic illustration of a CT scanner system in accordance with the present invention.

With reference to FIG. 1, a CT scanner or other non-invasive examination apparatus examines an interior region of a subject in an examination region 10 and generates data indicative thereof. The CT scanner includes a subject support or patient couch 12 for supporting a patient or other subject received in the examination region 10. An irradiating means 14, such as an x-ray tube, irradiates the patient with x-rays or other penetrating radiation. A radiation receiving means, such as radiation detectors 16, receive diagnostically encoded radiation which has traversed the examination region. In the preferred embodiment, the x-ray tube generates a fan-shaped beam of x-rays. The fan-shaped beam of x-rays passes through the subject and impinges upon an arc of the radiation detectors 16. The x-ray tube is mounted for rotation by a motor or other rotating means around the examination region, such that the subject is irradiated from a multiplicity of directions. The radiation detectors are positioned either in a stationary ring surrounding the examination region or in an arc which rotates with the x-ray tube to receive the radiation which has traversed the subject.

An original CT data memory means 18 stores the data collected by the radiation detectors 16. It will be noted, that each time a radiation detector is sampled, the intensity of sampled radiation represents a sum of the radiation absorptive properties of tissue lying along a ray or path between the x-ray source (at the time of the sampling) and the sampled detector. Because the intensity of radiation at the x-ray source is known and the intensity of detected radiation is known, the line integral of the material in the region 10 can be estimated such that it represents the line integral of the radiation absorption or attenuation along each ray.

A first order correction step or means 20 processes the original line integral CT data to generate a first order corrected image representation 22. An artifact image generating step or means 24 operates on the first order corrected image representation in order to generate a first order artifact or error image representation 26. An image combining means 28 subtractively combines the artifact image 26 with the first order corrected image 22 to generate a second order corrected image representation 30 of the slice through the high density clip.

A third order correcting step or means 32 derives line integrals corresponding to the rays which intersect the clip from the second order corrected image 30, substitutes the derived through the clip line integrals for the line integrals of the corresponding rays of the original data from original data memory 18, and reconstructs the substituted data to generate a third order corrected image representation 34. A second artifact image generating means or step 36 generates a second clip artifact or error image representation 38 from the third order corrected image 34 and the line integrals representing rays through the clip used internally in the third order correcting step or means 32. An image combining means 40 subtractively combines the third order corrected image representation 34 of the slice through the clip with the second image 38 to generate a fourth order corrected image representation 42 which is converted to a display on a video monitor 44.

Figure 2:
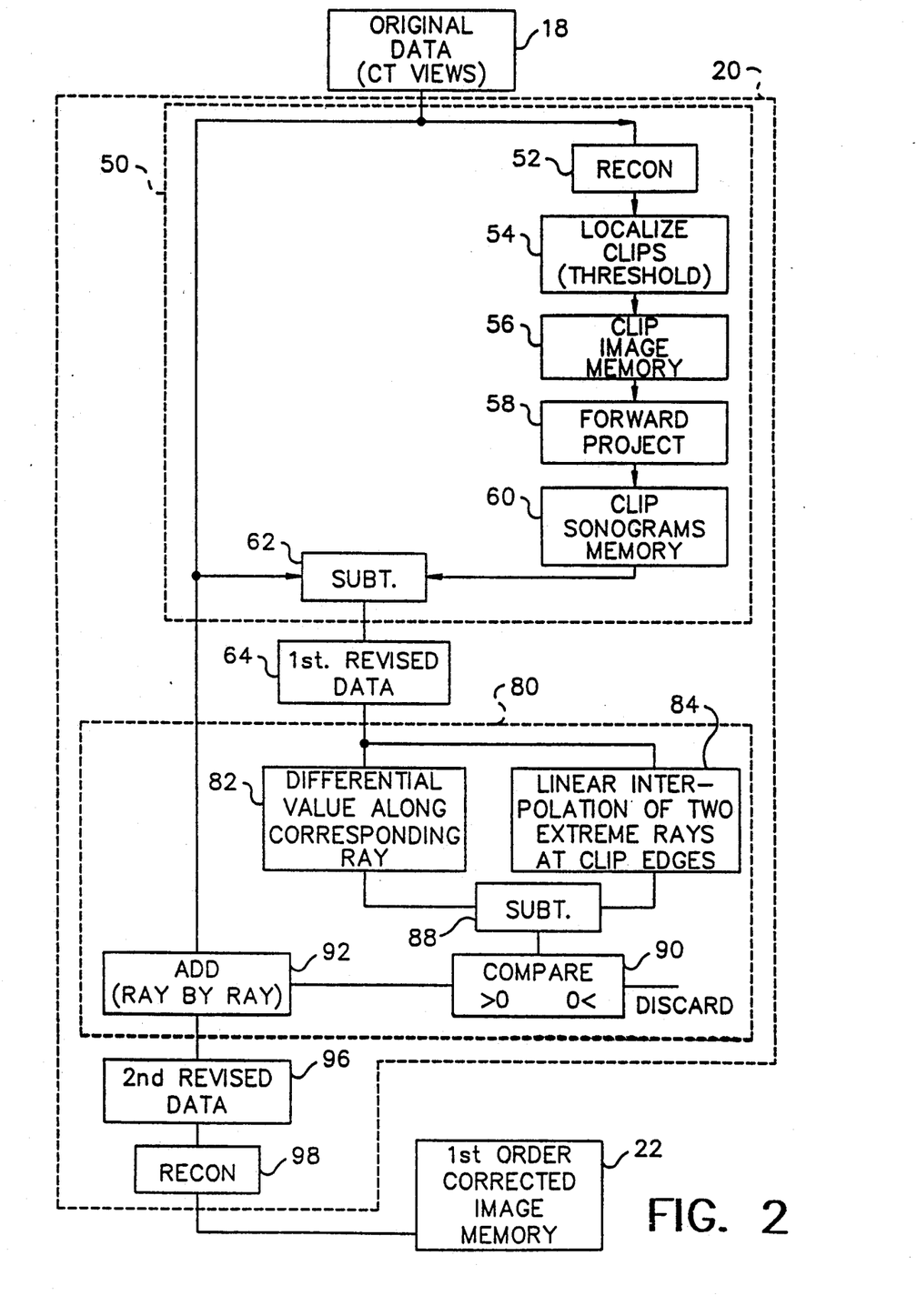
FIG. 2 is a detailed diagrammatic illustration of the steps or means 20 for generating the first order corrected image 22 of FIG. 1.

With reference to FIG. 2, the first order correction means 20 includes a step or means 50 for subtracting the line integral data corresponding to rays through the clips from the original data. More specifically, a reconstruction step or means 52 reconstructs an image representation from the original data, preferably by filtered backprojection. A thresholding step or means 54 adjusts the threshold of the data such that all but the clips are set to a white or background gray scale value. For example, all pixels of the reconstructed image representation which have a CT number in excess of 1700 retain their original value and those below 1700 are set to the CT number for air, i.e. minus −1000. A clip image memory means 56 stores the resultant image data, which if displayed, would show the metal clips in black and the remainder of the image in white. A forward projection means or step 58 forward projects the clip image to generate clip sinograms which are temporarily stored in a clip sinogram memory means 60. A subtracting means or step 62 subtracts the generated clip sinograms from the original data to generate a first set of revised data which is temporarily stored in a corresponding memory means 64.

Figure 3:
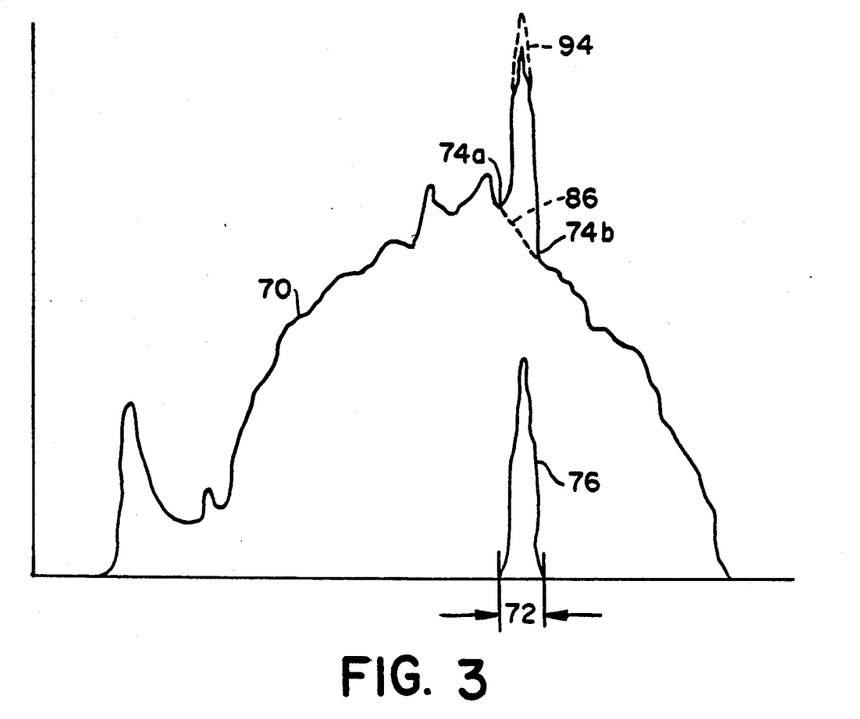
FIG. 3 is a diagrammatic illustration of a step or means 80 for adding a deficiency to correct for beam hardness.

With reference to FIG. 3, a typical view 70 of the original data includes data values which are the line integral along each ray of a fan-shaped array of rays with a common apex. A multiplicity of such views, each with a different apex, are processed by filtered backprojection to reconstruct an image representation. The views which have rays that intersect the clip typically have a series of contiguous rays 72 whose corresponding line integrals have a much higher value or sum than the line integrals 74a, 74b corresponding to rays at opposite edges of the clip. The clip sinogram memory 60 for each view defines a series of ray amplitudes 76. A deficiency compensating means or step 80 determines the deficiency in the difference or error attributable to beam hardness. The difference or differential value for each ray is temporarily stored in a differential value memory means 82. A linear interpolation step or means 84 determines a linear interpolation 86 between the end points 74a, 74b. A subtraction means 88 subtracts the corresponding linear interpolation value from the differential value ray by ray for each ray which passes through the clip. A comparing means 90 compares the difference with zero. If the differential value is less than the linear interpolation value for a ray, it is discarded. If the differential is greater than the linear interpolation value, then the difference is added to the line integral corresponding to the ray of the original data from memory means 18 by an adding means or step 92 to create corrected line integral data 94 which is stored in a second revised data memory 96.

An image reconstruction means or step 98 reconstructs the second revised data set 96 to create the first order corrected image 22. It will be noted, that the first order corrected image still has severe clip artifacts, however, the artifacts have been corrected for beam hardness.

Figure 4:
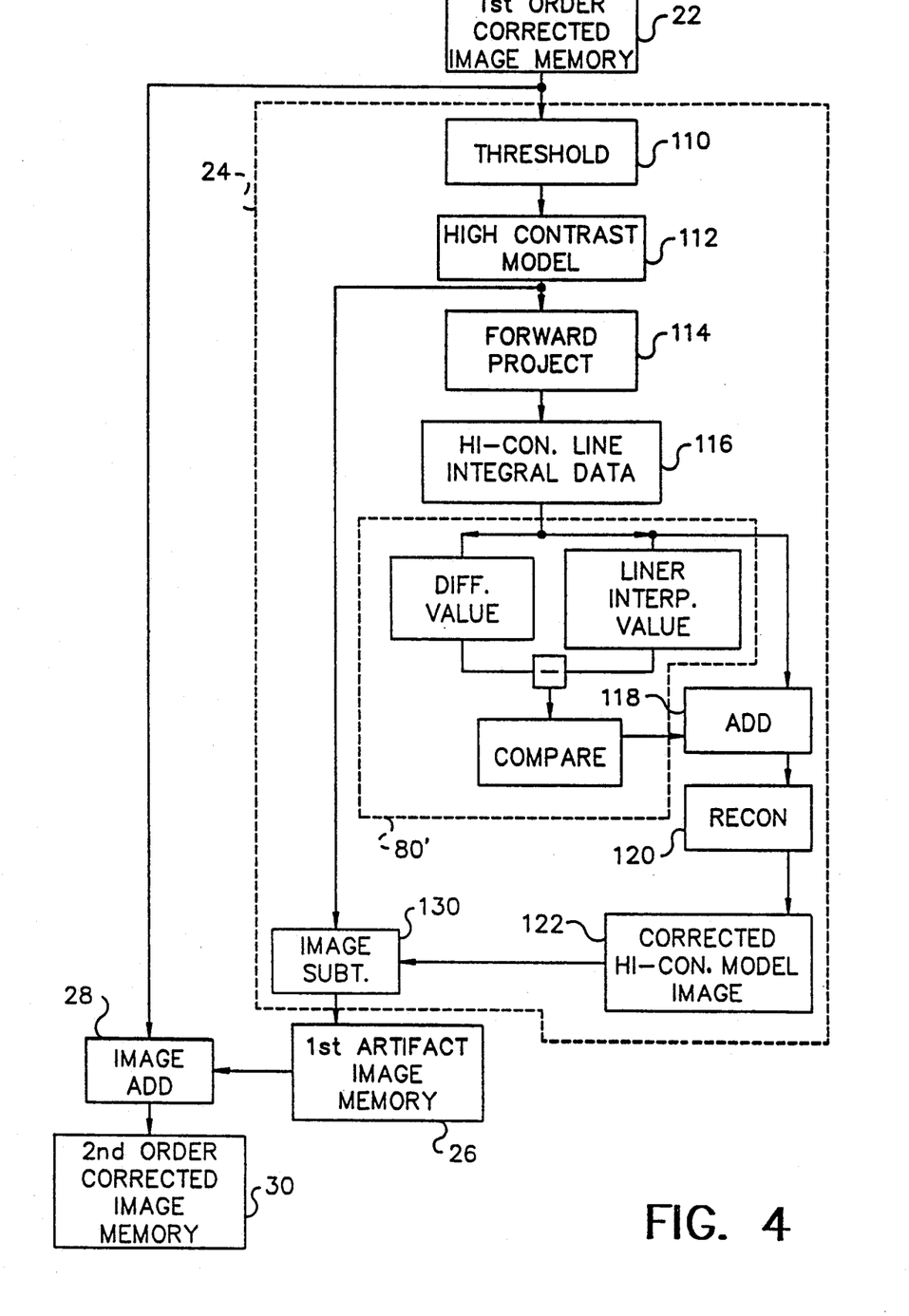
FIG. 4 is a diagrammatic illustration of the preferred steps or means 24 for generating the first artifact or error image 26 of FIG. 1.

With reference to FIG. 4, the artifact image generating means or step 24 includes a thresholding means 110 which adjusts the threshold of the first order corrected image 22 to create a high contrast model stored in memory means 112. That is, pixels of the first order corrected image which are in the range of water, e.g. CT numbers in the range of ±200 are set to the CT number of water, i.e. zero. Those pixels with a CT number near that of air, i.e. below −200, are set to the CT number of air, i.e. −1000. The remaining pixels are left unchanged. This creates a high contrast model image, i.e. an image representation of the bone and clip against a uniform water background. The high contrast model image representation from the memory means 112 is forward projected by a step or means 114 to create a set of line integral data values which are stored in a line integral data memory means 116. A deficiency compensating step or means 80' performs the process described above in conjunction with the deficiency compensating means 80' to generate deficiency compensating values which an adding means or step 118 adds ray by ray to the line integrals of the corresponding rays of the second revised data set 116. A reconstruction step or means 120 reconstructs the deficiency corrected line integral data to generate a corrected high contrast model image representation which is stored in a corresponding memory means 122.

A combining step or means 130 combines the corrected high contrast model image with the high contrast model from the high contrast model memory means 112 to generate the first clip artifact or error image representation 26 which is temporarily stored in a corresponding memory means. Again, the first clip artifact image representation 26 is subtractively combined with the first order corrected image representation 22 to generate the second order corrected image 30.

Figure 5:
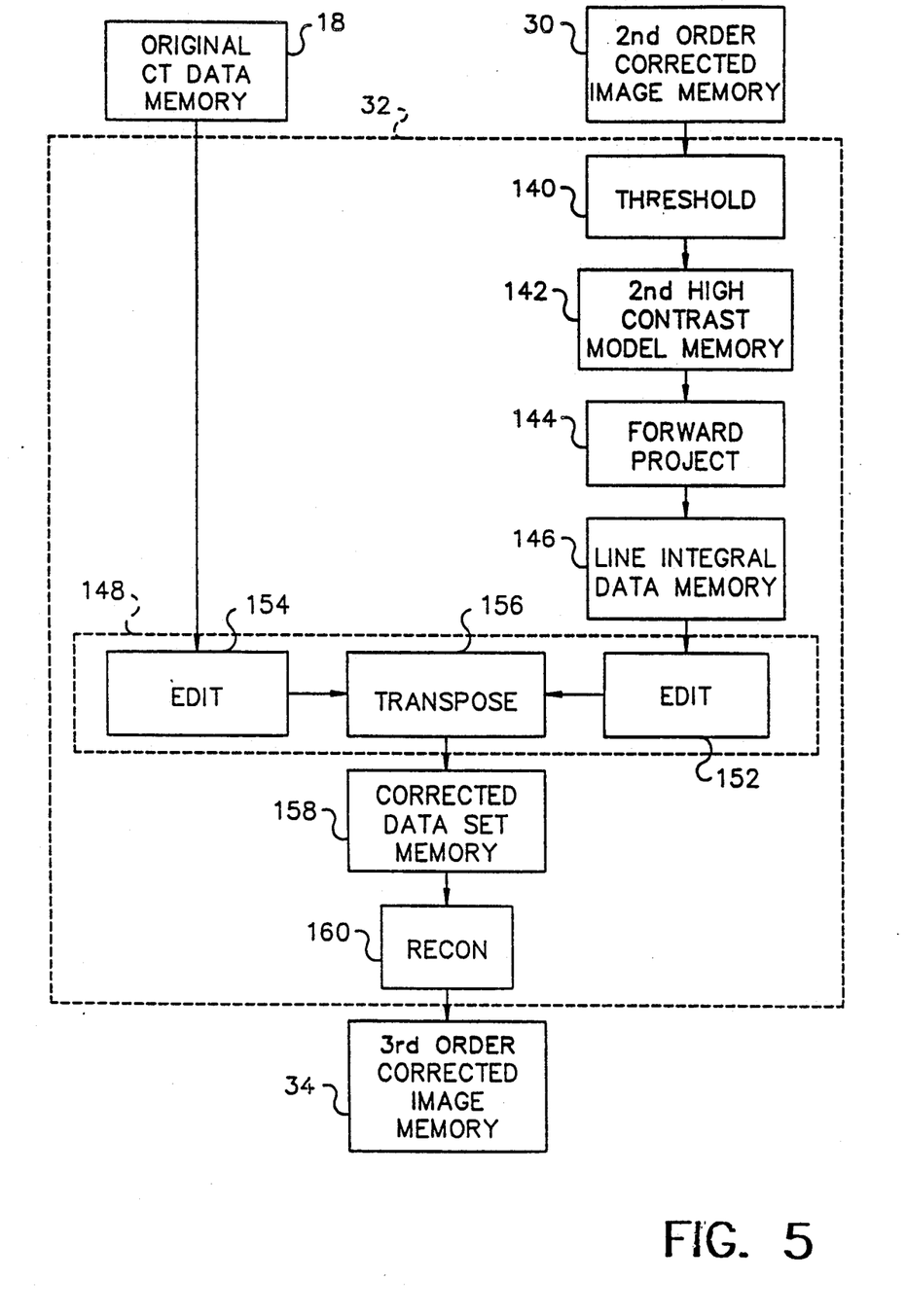
FIG. 5 is a diagrammatic illustration of the steps or means 32 for generating the third order corrected image 34 of FIG. 1.

With reference to FIG. 5, a thresholding means or step 140 derives a second high contrast model for storage in a second high contrast model memory means 142 from the second order corrected image 30. A forward projection means or step 144 forward projects the second high contrast model to generate a second set of high contrast model line integral data which is stored temporarily in a memory means 146. A topological transpose means or step 148 topologically transposes the clip line integrals from the high contrast model image for the corresponding line integrals of the original CT data from memory means 18.

Figure 6:
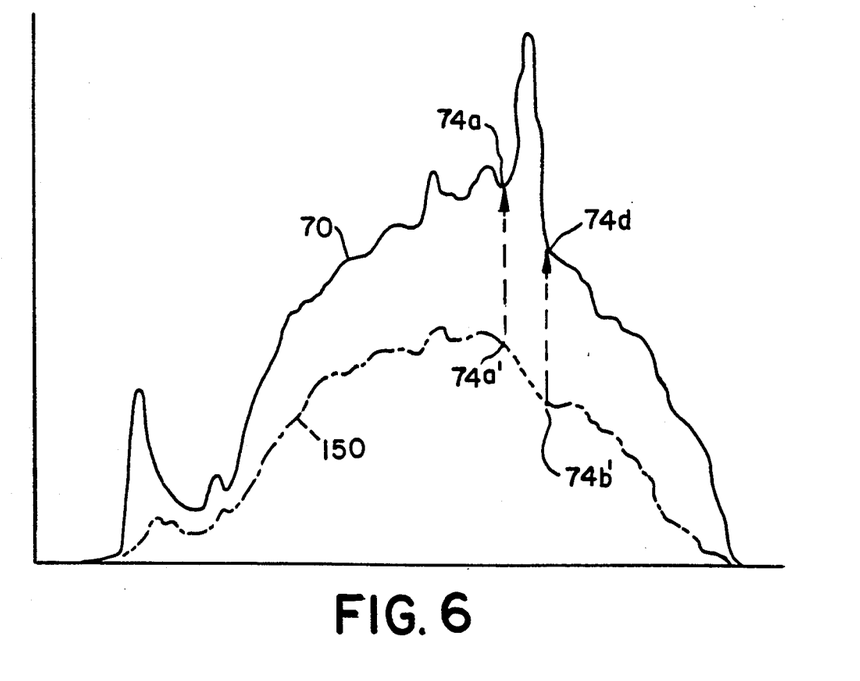
FIG. 6 illustrates the topological transposition of step or means 148 of FIG. 5.

With reference to FIG. 6, the high contrast model line integrals are arranged in views 150 which are shown lower in amplitude than the corresponding view 70 of the original image. An editing means 152 edits all of the high contrast view except the data between points 74a', 74b'. Another editing means or step 154 deletes the line integrals of the view of the original data between points 74a and 74b. A transposing means or step 156 adjusts the magnitude of the high contrast model data between 74a', 74b' until it fits in the original data between points 74a, 74b. After the clip portion of the line integrals from the high contrast image is topologically transposed into the clip portion of the original data, it is stored temporarily in a corrected data set memory means 158 and reconstructed by a reconstructing means or step 160 into the third order corrected image representation 34 which is temporarily stored in a corresponding memory means.

Figure 7:
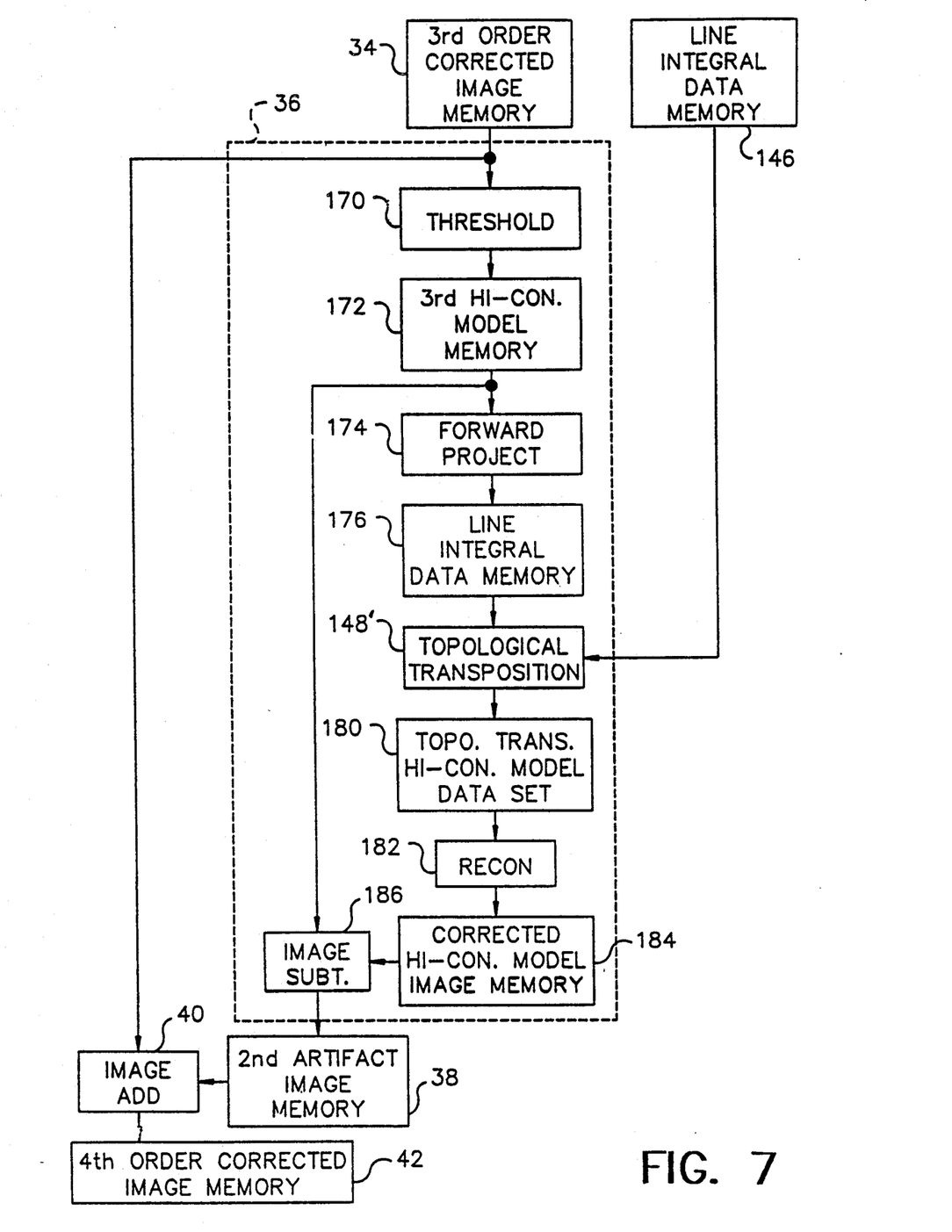
FIG. 7 is a diagrammatic illustration of the steps or means 36 for generating the artifact image 38 from the third order corrected image 34 and clip sinogram data from the step or means 32 of FIG. 1.

With reference to FIG. 7, the fourth order correcting means or step 36 includes a thresholding means or step 170 which adjusts the threshold of the third order corrected image representation 34 to create a third high contrast model of bone and clip tissue on a uniform water background which is stored in a corresponding memory means 172. A forward projecting means or step 174 forward projects the high contrast model to generate a high contrast model line integral data set which is stored in a corresponding memory means 176. A topological transposition means or step 148' replaces the line integral data corresponding to rays of the third high contrast model which intersect the clip with the line integrals of corresponding rays of the second high contrast model from the memory means 146. As the topological transposition is performed with respect to each view, it is stored temporarily in a topologically transposed high contrast model data set memory means 180. A reconstruction means or step 182 reconstructs the topologically transposed high density model line integral data into a corrected high contrast model image which is stored temporarily in a corresponding memory means 184. An image subtraction means 186 subtractively combines the third high contrast model with the corrected high contrast model image to generate the negative artifact image 38. The negative artifact image 38 is again combined by a combining means 40 with the third order corrected image 34 to form a fourth order corrected image representation 42 that is converted to a man-readable image displayed on the video monitor 44. Optionally, the fourth order image 42 may be subject to higher order corrections by repeating corrections 32 and 36.

Figure 8:
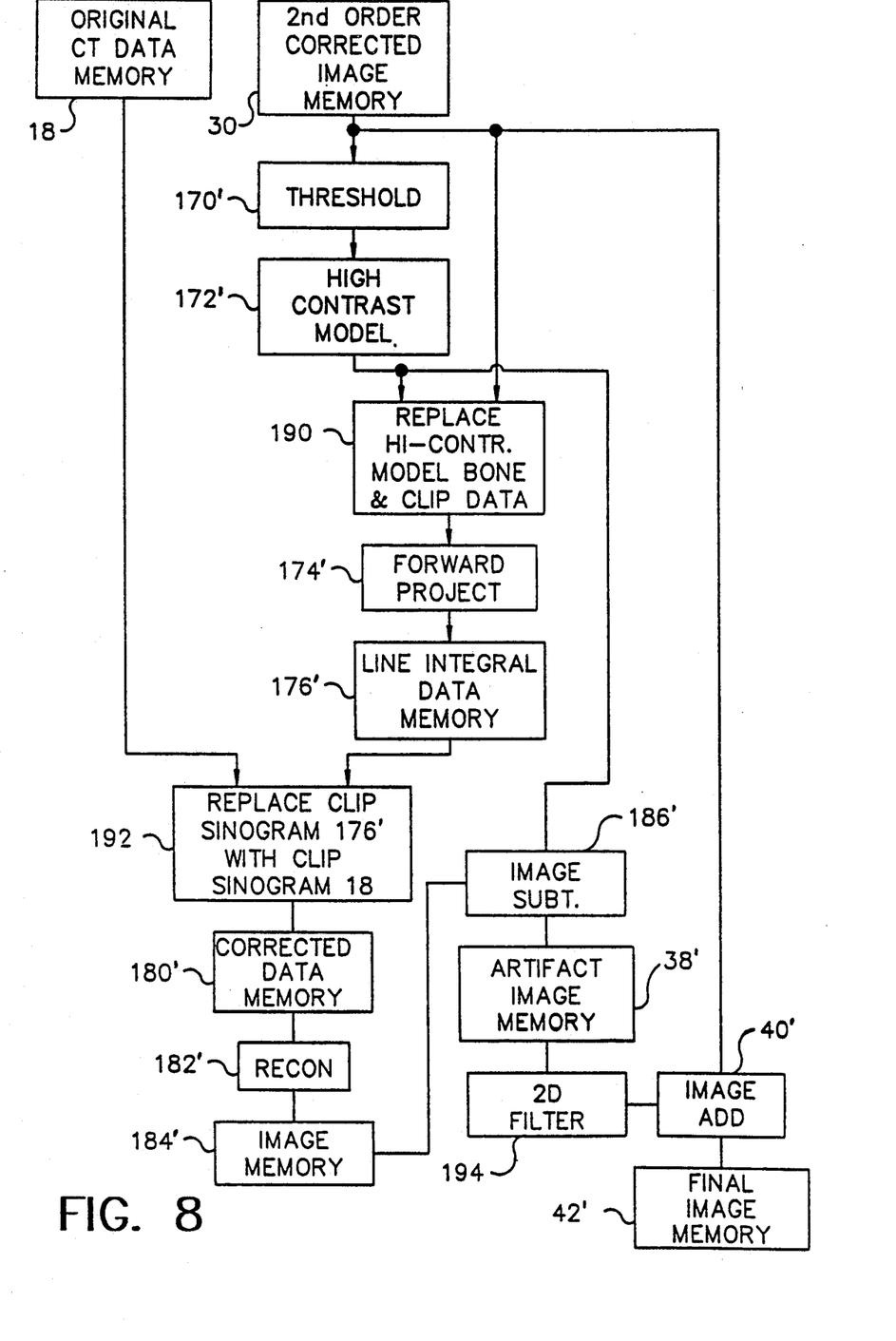
FIG. 8 is a diagrammatic illustration of an alternate embodiment of steps or means for generating a final image 42' from the second order corrected image 30.

With reference to FIG. 8, the artifact image 38 can be generated by corrupting the high contrast data along the sinograms of the clip with the original data. The difference between the high contrast image and the reconstruction of the corrupted high contrast data generates an estimate of the error due to the corrupting, i.e. the artifact. More specifically, a thresholding means or step 170' generates a high contrast model 172'. A step or means 190 replaces the pixels of the high contrast image which correspond to bone or clips with the pixel values from the corresponding locations of the second order corrected image. 30. In this manner, a high contrast model corrupted with the bone and clip information of the original image is created. A forward projecting means or step 174' forward projects the corrupted high contrast image to create line integral data which is stored in a corresponding memory 176'. A step or means 192 replaces the clip sinograms with the corresponding sinograms from the original data set 18. That is, the line integrals of each view which correspond to rays which intersect the clip are replaced with the line integrals of the corresponding rays of the original data. The corrected data set is temporarily stored in a memory means 180 ' and reconstructed by a reconstruction step or means 182' to generate an image representation which is stored in a memory means 184'. An image subtracting means or step 186' subtracts the image representation 184' from the high contrast model 172' to generate an error or artifact image 38'. A filtering means 194 filters the error image representation to remove high frequency components or streaks. An image adding means 40' adds the filtered artifact image to the second order corrected image 30 to generate a final image representation 42' for display on the video monitor.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of diagnostic imaging in which streak artifacts from high density materials are reduced, the method comprising:
   passing penetrating radiation through a subject along a plurality of rays;
   converting an intensity of radiation which has traversed each ray through the subject into CT data values, each data value being indicative of a line integral of radiation absorptive or transmissive properties of material along the corresponding ray;
   reconstructing a first image representation from the CT data values;
   deriving a first artifact image representation from the CT data values, which first artifact image representation is indicative of artifacts attributable to the high density material in the subject;
   combining the first image representation and the first artifact image representation to generate a second order corrected image representation indicative of the slice through the subject with a correction made for the high density material artifact.

2. The method as set forth in claim 1 further including:
   generating a high contrast model from the second order corrected image representation, which high contrast model represents an image of bone and high density materials with a uniform water background;
   generating a set of high contrast model line integral data corresponding to the high contrast model;
   topologically transposing high contrast model line integral data corresponding to rays which intersect the high density material for CT data values of corresponding rays of the CT data to generate a topologically translated data set;
   reconstructing the topologically translated data set into a third order corrected image representation.

3. A method in which streak artifacts from high density materials are reduced, the method comprising:
   passing penetrating radiation through a subject along a plurality of rays;
   converting an intensity of radiation which has traversed each ray through the subject into CT data values, each data value being indicative of a line integral of radiation absorptive or transmissive properties of material along the corresponding ray;
   reconstructing a first image representation from the CT data values;
   deriving a first artifact image representation from the CT data values, which first artifact image representation is indicative of artifacts attributable to the high density material in the subject;

combining the first image representation and the first artifact image representation to generate a second order corrected image representation indicative of the slice through the subject with a correction made for the high density material artifact;

generating a high contrast model from the second order corrected image representation, which high contrast model represents an image of bone and high density materials against a uniform water background;

generating a set of high contrast model line integral data corresponding to the high contrast model;

topologically transposing high contrast model line integral data corresponding to rays which intersect the high density material for CT data values of corresponding rays of the CT data to generate a topologically translated data set;

reconstructing the topologically translated data set into a third order corrected image representation;

generating a second artifact image representation from the third order corrected image representation and the high contrast model line integral data;

subtractively combining the second artifact image representation with the third order corrected image representation to generate a fourth order corrected image representation.

4. The method as set forth in claim 3 further including connecting the fourth order corrected image representation into a man-readable display.

5. The method as set forth in claim 4 wherein the step of generating the first image representation includes:

reconstructing an image representation from the CT data values;

thresholding the reconstructed image representation to generate an image representation of only the high density material;

forward projecting the high density material image to generate a set of high density line integral data corresponding to the high density material image representation;

subtractively combining the high density material line integral data with the CT data values to generate a revised data set;

compensating for beam hardness effects by adding a deficiency compensation derived from the first revised data set to the CT data values;

reconstructing the deficiency compensated CT data values to generate the first image representation.

6. The method as set forth in claim 5 wherein the deficiency compensating step includes:

determining a linear interpolation of line integral data corresponding to rays which intersect opposite extremes of the high density material to generate a linear interpolated value corresponding to each ray which intersects the high density material;

determining a differential value for the line integral data corresponding to each ray which intersects the high density material;

for each ray which intersects the high density material, subtracting the linear interpolation value and the differential value;

comparing the differential and linear interpolation values of the corresponding ray;

in response to the linear interpolation value exceeding the differential value, adding the difference to the corresponding ray of the original CT data.

7. The method as set forth in claim 4 wherein the step of generating the first artifact image representation includes:

thresholding the first order corrected image representation to generate a high contrast model image representing an image of bone and high density material;

forward projecting the high contrast model to generate a set of line integral data corresponding to the high contrast model;

determining a linear interpolation of line integral data corresponding to rays which intersect opposite extremes of the high density material to generate a linear interpolated value corresponding to each ray which intersects the high density material;

determining a differential value for the line integral data corresponding to each ray which intersects the high density material;

for each ray which intersects the high density material, subtracting the corresponding linear interpolation value and the differential value;

comparing the differential and linear interpolation values corresponding to each ray;

in response to the linear interpolation value exceeding the differential value, adding the difference to the high contrast model line integral corresponding ray;

reconstructing the data of the high contrast model into a corrected high contrast model image representation;

subtractively combining the corrected high contrast model image representation and the high contrast model to generate the first artifact image representation.

8. The method as set forth in claim 4 wherein the topological transformation step includes:

discarding the data values of the CT data set corresponding to rays passing through the high density material;

adjusting an amplitude of line high contrast model integral data in accordance with values of the CT data values corresponding to rays immediately adjacent opposite sides of the high density material;

inserting the amplitude adjusted high contrast model line integral data for the corresponding rays of the CT data values.

9. The method as set forth in claim 4 wherein the step of generating the second artifact image representation includes:

thresholding the third order corrected image representation to generate a second high contrast model;

forward projecting the second high contrast model into second high contrast model line integral data set;

topologically transposing line integral data corresponding of the first high contrast model for corresponding rays of the second high contrast model line integral data;

reconstructing a corrected high contrast model image representation from the topologically transposed second high contrast model line integral data;

subtractively combining the second high contrast model image representation and the corrected high contrast model image representation to generate the second artifact image.

10. A method of diagnostic imaging in which streak artifacts from a high density material are reduced:

passing penetrating radiation through a subject along a plurality of rays;

converting an intensity of radiation which has traversed each ray through the subject into CT data values, each data value being indicative of a line integral of radiation absorptive or transmissive properties of material along the corresponding ray;

reconstructing a first image representation from the CT data values;

generating a high contrast model from the first image representation;

forward projecting the high contrast model to generate high contrast model line integral data;

replacing portions of the high contrast model line integral data that corresponds to rays passing through the high density material with corresponding CT data values;

reconstructing the high contrast model line integral data with replaced portions into a second image representation;

subtractively combining the second image representation and the high contrast model to create an artifact image representation;

combining the first image representation and the first artifact image representation to generate a second order corrected image representation indicative of the slice through the subject with a correction made for the high density material artifact.

11. The method as set forth in claim 10 further including before the forward projecting step, replacing portions of the high contrast model that correspond to bone and clip with corresponding portions of the first image representation.

12. A method of diagnostic imaging in which streak artifacts from a high density clip are reduced, the method comprising:

converting an intensity of penetrating radiation which has traversed each of a plurality of rays through a subject into subject data indicative of sums of radiation absorptive or transmissive properties of material along the corresponding rays;

reconstructing a streak artifact contaminated image representation from the subject data;

deriving an artifact image representation from the subject data, which artifact image representation is indicative of artifacts attributable to the high density clip;

subtractively combining the streak artifact contaminated image representation and the artifact image representation to generate a streak artifact corrected image representation.

13. The method as set forth in claim 12 wherein the artifact image representation deriving step includes:

generating a high contrast model from the streak artifact contaminated image representation;

forward projecting the high contrast model to generate high contrast model line integral data;

replacing portions of the high contrast model line integral data that corresponds to rays passing through the clip with corresponding subject data;

reconstructing the high contrast model line integral data with replaced portions into a revised high contrast model image representation;

subtractively combining the revised high contrast model image representation and the high contrast model to create the artifact image representation.

14. The method as set forth in claim 12 wherein the step of generating the artifact image representation includes:

thresholding the streak artifact contaminated representation to generate a high contrast model;

forward projecting the high contrast model into a high contrast model line integral data set; topologically transposing substitute line integral data for a portion of the high contrast model line integral data which corresponds to rays that intersect the clip;

reconstructing a corrected high contrast model image representation from the topologically transposed high contrast model line integral data;

subtractively combining the high contrast model and the corrected high contrast model image representation to generate the artifact image representation.

15. The method as set forth in claim 12 further including the step of displaying the streak artifact corrected image representation.

16. A method of diagnostic imaging in which streak artifacts from a high density clip are reduced, the method comprising:

passing penetrating radiation through a subject along a plurality of rays;

converting an intensity of radiation which has traversed each ray through the subject into line integral data indicative of line integrals of radiation absorptive or transmissive properties of the subject along the corresponding rays;

reconstructing an image representation from the subject line integral data;

generating a high contrast model from the image representation, which high contrast model represents bone and the clip;

forward projecting a set of high contrast model line integral data from the high contrast model;

topologically transposing high contrast model line integral data corresponding to rays which intersect the clip for the subject line integral data of corresponding rays;

reconstructing the topologically translated subject line integral data into a corrected image representation.

17. The method as set forth in claim 16 wherein the topological transformation step includes:

discarding portions of the subject line integral data corresponding to rays passing through the clip;

adjusting the amplitude of the high contrast model line integral data corresponding to rays through the clip in accordance with subject line integral;

inserting the amplitude adjusted high contrast model line integral data for the discarded portions of the subject line integral data.

18. A method of diagnostic imaging in which streak artifacts from a high density clip are reduced, the method comprising:

converting an intensity of penetrating radiation which has traversed each of a plurality of rays through a subject into line integral data indicative of line integrals of radiation absorptive or transmissive properties of the subject along the corresponding rays;

reconstructing an image representation from the subject line integral data;

thresholding the reconstructed image representation to generate an image representation of at least the clip;

forward projecting the clip image representation to generate clip line integral data;

subtractively combining the clip and subject line integral data to generate revised line integral data;

compensating for beam hardness effects by adding a deficiency compensation derived from the revised line integral data to the subject line integral data;

reconstructing the deficiency compensated subject line integral data to generate a corrected subject image representation.

19. The method as set forth in claim 18 wherein the thresholding step includes:

thresholding the reconstructed image representation to generate an image representation of the clip and bone, whereby the clip line integral data is based on both the bone and the clip.

20. A method of diagnostic imaging comprising:

passing penetrating radiation along a plurality of rays through a portion of a subject that includes a high density clip;

converting an intensity of radiation which has traversed each ray into line integral data indicative of line integrals of radiation absorptive or transmissive properties of the subject along the corresponding rays;

reconstructing an image representation from the subject line integral data;

thresholding the reconstructed image representation to generate an image representation of at least the clip;

forward projecting the clip image representation to generate clip line integral data;

subtractively combining the clip and subject line integral data to generate revised line integral data;

determining a linear interpolation of portions of the revised line integral data corresponding to rays which intersect opposite extremes of the clip to generate a linear interpolated data value corresponding to each ray of the revised line integral data intersects the clip;

determining a differential value from the revised line integral data corresponding to each ray that intersects the clip;

for each ray which intersects the clip, subtracting the corresponding linear interpolated value and the differential value;

in response to the linear interpolation value exceeding the differential value of the corresponding ray, adding the difference to the subject line integral value to generate deficiency compensated subject line integral data;

reconstructing the deficiency compensated subject line integral data to generate a corrected subject image representation.

21. A method of diagnostic imaging in which streak artifacts from a high density clip are reduced, the method comprising:

passing penetrating radiation through a subject along a plurality of rays;

converting an intensity of radiation which has traversed each ray through the subject into line integral data indicative of line integrals of radiation absorptive or transmissive properties of material along the corresponding rays;

generating high contrast line integral data from the subject line integral data, which high contrast line integral data corresponds to higher density portions of the subject and the clip;

determining a linear interpolation of a portion of the high contrast line integral data corresponding to rays which intersect opposite extremes of the clip to generate a linear interpolated data value corresponding to each ray that intersects the clip;

determining a differential value from the high contrast line integral data corresponding to each ray that intersects the clip;

for each ray which intersects the high density material, subtractively combining the corresponding linear interpolated and differential values;

adding the difference between the linear interpolated and differential values to the high contrast model line integral of the corresponding ray, at least when the linear interpolated value exceeds the differential value;

correcting a subject image representation generated from the subject line integral data in accordance with the high contrast line integral data with the added difference.

22. The method as set forth in claim 21 wherein the correcting step includes:

generating a corrected high contrast image representation from the high contrast line integral data with the added difference;

subtractively combining the corrected high contrast model image representation with an uncorrected high contrast model image representation to generate an artifact image representation;

subtractively combining the subject image representation and the artifact image representation.

23. An apparatus for diagnostic imaging in which streak artifacts from high density materials are reduced, the apparatus comprising:

means for passing penetrating radiation through a subject along a plurality of rays;

means for converting an intensity of radiation which has traversed each ray through the subject into line integral data values, each line data value being indicative of a line integral of radiation absorptive or transmissive properties of material along the corresponding rays;

means for reconstructing a streak artifact contaminated image representation from the line integral data;

means for deriving an artifact image representation from the line integral data values, which artifact image representation is indicative of artifacts attributable to the high density material in the subject;

means for combining the streak artifact contaminated image representation with the artifact image representation to generate a corrected image representation.

24. A diagnostic imaging apparatus for generating images in which streak artifacts from high density material are reduced, the apparatus comprising:

a means for reconstructing a first image representation from line integral data values, which line integral data value are each indicative of a line integral of radiation absorptive or transmissive properties of material along one of a plurality of corresponding rays through a portion of the subject that contains the high density material;

a means for deriving an artifact image representation from the line integral data values, which artifact image representation is indicative of artifacts attributable to the high density material in the subject;

a means for combining the first image representation and the artifact image representation to generate a second order corrected image representation indicative of the slice through the subject with a correction made for the high density material artifact.

25. A diagnostic imaging apparatus for generating diagnostic images in which streak artifacts from a high density clip are reduced, the apparatus comprising:

a means or reconstructing a first image representation from line integral data values, which line integral data values are each indicative of a line integral of radiation absorptive or transmissive properties of material along one of a plurality of corresponding rays through a portion of the subject that contains the high density clip;

a means for generating a high contrast model from the first image representation, which high contrast model represents bone and the clip;

a means for forward projecting a set of high contrast model line integral data from the high contrast model;

a means for topologically transposing high contrast model line integral data corresponding to rays which intersect the clip for the subject line integral data of corresponding rays;

a means for reconstructing the topologically translated subject line integral data into a corrected image representation.

26. A diagnostic imaging apparatus for generating diagnostic image representations in which streak artifacts from a high density clip are reduced, the method comprising:

a means for passing penetrating radiation along a plurality of rays through a subject;

a means for converting an intensity of radiation which has traversed each ray into line integral data indicative of line integrals of radiation absorptive or transmissive properties of the subject along the corresponding rays;

a means for reconstructing an image representation from the subject line integral data;

a means for thresholding the reconstructed image representation to generate an image representation of at least the clip;

a means for forward projecting the clip image representation to generate clip line integral data;

a means for subtractively combining the clip and subject line integral data to generate revised line integral data;

a means for compensating for beam hardness effects by adding a deficiency compensation derived form the revised line integral data to the subject line integral data;

a means for reconstructing the deficiency compensated subject line integral data to generate a corrected subject image representation.

27. A CT scanner comprising:

a means for passing penetrating radiation through a subject along a plurality of rays;

a means for converting an intensity of radiation which has traversed each ray through the subject into line integral data indicative of line integrals of radiation absorptive or transmissive properties of material along the corresponding rays;

a means for generating high contrast line integral data from the subject line integral data, which high contrast line integral data corresponds to higher density portions of the subject and the clip;

a means for determining a linear interpolation of a portion of the high contrast line integral data corresponding to rays which intersect opposite extremes of the clip to generate a linear interpolated data value corresponding to each ray that intersects the clip;

a means for determining a differential value from the high contrast line integral data corresponding to each ray that intersects the clip;

a means for subtractively combining the corresponding linear interpolated and differential values for each ray which intersects the high density material;

a means for adding the difference between the linear interpolated and differential values to the high contrast model line integral of the corresponding ray, at least when the linear interpolated value exceeds the differential value;

a means for correcting a subject image representation generated from the subject line integral data in accordance with the high contrast line integral data with the added difference.

* * * * *